United States Patent [19]

Petrzilka

[11] 3,920,705
[45] Nov. 18, 1975

[54] 6A,10A-TRANS-6A,10,10A-TETRAHY-DRODIBENZO(B,D)-PYRANS

[76] Inventor: Theodore Petrzilka, Rigistrasse 6, 8703 Erlenbach, Switzerland

[22] Filed: Nov. 1, 1972

[21] Appl. No.: 302,829

Related U.S. Application Data

[63] Continuation-in-part of Ser. No. 52,079, July 2, 1970, abandoned, which is a continuation-in-part of Ser. No. 727,111, May 1, 1968, Pat. No. 3,560,528.

[30] Foreign Application Priority Data

May 19, 1967 Switzerland.......................... 7081/67

[52] U.S. Cl. .............................. 260/345.3; 424/283
[51] Int. Cl.² ........................................ C07D 311/80
[58] Field of Search ................................. 260/345.3

[56] References Cited
UNITED STATES PATENTS

| | | | |
|---|---|---|---|
| 3,388,136 | 6/1968 | Taylor et al. ..................... | 260/345.3 |
| 3,507,885 | 4/1970 | Fahrenholtz..................... | 260/345.3 |
| 3,576,887 | 4/1971 | Hughes et al. .................. | 260/345.3 X |
| 3,734,930 | 5/1973 | Razdan et al. ................... | 260/345.3 |

Primary Examiner—John M. Ford
Attorney, Agent, or Firm—Werner W. Kleeman

[57] ABSTRACT

(−)-optical antipodes of dibenzopyran compounds of the formula

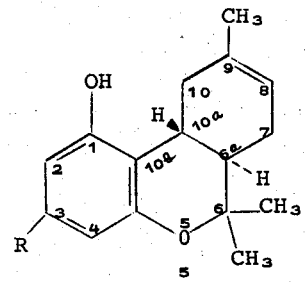

wherein R is hydrogen, an alkyl radical having from 1 to 4 carbon atoms, or an alkyl radical having from 6 to 10 carbon atoms, which (−)-optical antipodes are in a substantially pure form and are substantially free of their corresponding (+)-optical antipodes. Pharmaceutical preparations according to the invention exhibit unexpected, superior psychotomimetic, sedative and analgesic activity in animals, including humans.

3 Claims, No Drawings

6A,10A-TRANS-6A,10,10A-TETRAHYDRODIBENZO(B,D)-PYRANS

This application is a continuation-in-part of my copending application Ser. No. 52,079, filed July 2, 1970, now abandoned, which in turn is a continuation-in-part of my application Ser. No. 727,111, filed May 1, 1968, now U. S. Pat. No. 3,560,528. The priority of U.S. Pat. No. 3,560,528 is based upon Swiss application 7081/67.

The present invention relates to 6a, 10a-trans-6a, 7, 10, 10a- tetrahydrodibenzo (b,d)-pyrans and, more particularly to (−)-optical antipodes of these compounds and their use as pharmacological agents.

In accordance with this invention, it has been discovered that compounds of the general formula

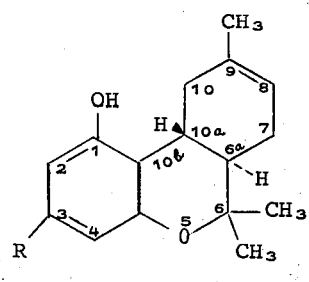

wherein R is hydrogen or alkyl containing from 1 to 10 carbon atoms and, in particular their (−)-optical antipodes, can be synthesized in substantially pure form by condensing, in the presence of an acid agent, a resorcinol of the general formula

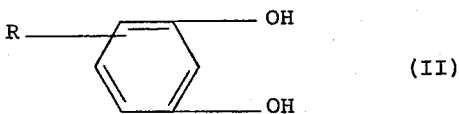

wherein R is as above, with either 1, 5, 8-menthatriene which has the formula

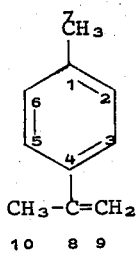

or with (+) p-menthadien (2,3)-ol-(1) which has the general formula

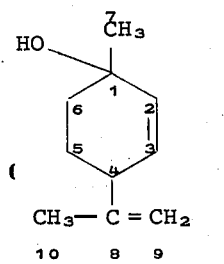

The compound of formula I when R is pentyl is a naturally occurring product which has known bactericidal, sedative, analgesic, and psychotomimetic properties. Accordingly, the present invention relates only to the compounds of formula I where R is either hydrogen, an alkyl radical having from 1 to 4 carbons, or an alkyl radical having from 6 to 10 carbon atoms which are in substantially pure form as the (−)-optical antipodes substantially free of the (+) form. The novel compounds of formula I have been found, quite unexpectedly, to exhibit psychotomimetic, analgesic, sedative, and bactericidal properties superior to those properties possessed by both the naturally occurring compound and the corresponding racemates, which are also known as described in U.S. Pat. Nos. 3,388,136, 3,507,885 and 3,576,887.

The numbering of the rings in compounds of the general formulae I, II, III and IV is shown for the purpose of convenience. As used throughout the application, the term alkyl in the group R comprehends both straight and branched chain alkyl groups containing from 1 to 10 carbon atoms, such as inter alia methyl, ethyl, n-propyl, isopropyl, n-butyl, tert-butyl, n-hexyl, n-heptyl, and n-octyl, with the exception of pentyl. R may also be any of the following groups:

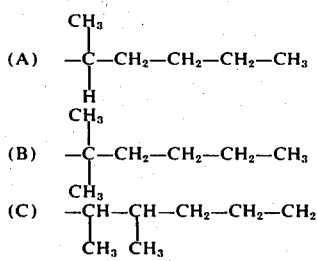

Group A above, may be referred to either as α-methyl-pentyl or hexyl (2); group B can be termed either α,α-dimethyl-pentyl or 2-methylhexyl (2); and group C is either α,β-dimethyl-heptyl or 3-methyl-octyl(2).

The compounds of formula I above, are useful as psychotomimetic, sedative and analgesic agents and in methods for obtaining such pharmacological effects in animals, including humans. The compounds of formula I above are used as active ingredients in conventional pharmaceutical preparations which contain these compounds in connection with conventional pharmaceutically acceptable organic or inorganic carrier materials suitable for internal administration. The pharmaceutical compositions containing the compounds of formula I above can be administered parenterally or orally, and dosages can be adjusted to individual requirements; for example, these compounds can be administered in dosages of from about 0.1 mg/kg to about 5 mg/kg per day. These dosages can be administered in single dosage form or in divided dosage forms. The pharmaceutical compositions can contain conventional organic or inorganic inert carrier materials, such as water, gelatin, lactose, starch,, magnesium stearate, talc, vegetable oils, gums, polyalkylene glycol, Vaseline or the like. The pharmaceutical preparations can be in the conventional solid forms such as tablets, dragees, suppositories, capsules or in conventional liquid form such as solutions, suspensions or emulsions. The pharamaceutica compositions can be submitted to conventional pharmaceutical expedients, such as sterilization, and can contain conventional pharmaceutical additives, such as preservatives, stabilizing agents, wetting agents, emulsifying agents, salts for adjusting the osmotic pressure, buffers or the like. They can also contain other therapeutically useful materials.

The compounds of formula I above, as is evident from its structural configuration, can be optically active as well as stereospecific about the 6a, 10a-positions. Any of the stereoisomers of the (+)-p-methadienol-(1) of formula IV above which are (+)-cis and (+)-trans-p-methadienol-(1) as well as the racemic mixture thereof can be utilized in the process of this invention to produce the compounds of formula I above. The optical configuration about the 4-position of the compound of formulae III or IV used as one of the starting materials will determine the optical configuration about the 6a, 10a-positions of the end products of formula I. Thus, by employing the appropriate starting materials of formulae III or IV above there can be obtained a racemic mixture of a compound of formula I or the optically active (−)-antipode to which the present invention specifically relates.

As examples of the compounds of formula II above that can be utilized in the process of this invention are included resorcinol, 5-ethyl resorcinol, 2-(3,5-dihydroxyphenyl)hexane, 2-(3,5-dihydorxyphenyl)-3-methyl octaine, 5-n-propyl resorcinol, 5-methyl resorcinol (orcinol), 5-n-pentyl resorcinol (olivetol), 5-(1-methylbutyl)-resorcinol, 5-n-hexylresorcinol, 5-(1ethylbutyl)resorcinol, 5-(1-methyl-pentyl)resorcinol, 5-(1,1-dimethylbutyl) resorcinol, 5-(1,2-dimethylbutyl) resorcinol, 5-n-heptylresorcinol, 5-(1-methylhexyl)resorcinol, t-n-octylresorcinol, 5-(1-n-propylpentyl)-resorcinol, 5-(1,2-dimethylheptyl)resorcinol, 5-(1-methyloctyl)resorcinol, and the like.

The condensation reaction to obtain the compounds of this invention can be carried out in a conventional inert solvent. Among the preferred solvents are included aliphatic or aromatic hydrocarbons, such as petroleum ether, benzene, and toluene; halogenated aliphatic or aromatic hydrocarbons, such as methylene chloride, chloroform, carbon tetrachloride, and chlorobenzene; nitrated hydrocarbons, such as nitrobenzene; and ethers, such as diethyl ether, tetrahydrofuran, and dioxan. Among the other conaentional solvents which are preferred to be utilized in the process of this invention are included dimethylformamide, dimethylsulphoxide, and liquid sulphur dioxide.

The reaction of this invention to produce the compounds of formula I above is carried out in the presence of any conventional organic or inorganic acid agents. Among the preferred acid agents which can be utilized in carrying out the process of this invention are included Lewis acids, such as boron trifluoride, zinc chloride, aluminum chloride, tin tetrachloride, and the like; mineral acids, such as hydrochloric acid, hydrobromic acid, hydrofluoric acid, sulfuric acid, phosphoric acid, polyphosphoric acids, and the like; and organic acids such as p-toluene sulphonic acid, methane sulphonic acid, formic acid, glacial acetic acid, trifluoroacetic acid, trichloroacetic acid, oxalic acid, maleic acid and the like. Sulphur dioxide can be utilized as both the acid medium and the organic solvent. Therefore, when liquid sulphur dioxide is utilized as the solvent medium, the reaction of this invention will take place without the addition of any other acid agent.

In carrying out the condensation reaction of this invention, the two reactants may be present in any mole ratio. Generally, in carrying out the reaction of this invention, it is preferred to utilize the compound of formula II above and either the compound of formula III above or the compound of formula IV above in equimolar amounts or with a slight excess of either the compound of formula III above or the compound of formula IV above.

In carrying out this condensation reaction to produce the compound of formula I above, temperature and pressure are not critical and this reaction can be carried out at room temperature and atmospheric pressure. If desired, lower or elevated temperatures can be utilized. This condensation reaction is advantageously effected at a temperature of from about 0°C. to about 120°C. In a preferred embodiment of this invention, the reaction is carried out in the presence of p-toluene-sulphonic acid in benzene by heating to a temperature of about 80°C. for 2 hours under reflux conditions.

The process of this invention provides a simple and economic means of converting resorcinols into sterically defined compounds of formula I above.

The following examples serve to illustrate the invention but are not limitative thereof. All temperatures are in degrees Centigrade.

Example 1

A mixture of 2.6 g. (13.4 mMol) of 2-(3,5-dihydroxyphenol) hexane, 2.05 g. (13.4 mMol) of +-trans-p-menthadien-(2,8)-ol-(1) and 260 mg. (1.35 MMol) of p-toluenesulphonic acid monohydrate in 60 ml of benzene is boiled under reflux for 2 ½ hours. The resulting orange solution is cooled in an ice-water bath and dissolved in diethyl ether. The ether solution is immediately shaken once with a dilute sodium hydrogen carbonate solution and once with a sodium chloride solution. The now almost completely colorless ether solution is dried over sodium sulphate. After evaporation of the ether there remains 4.85 g. of a light yellow oil. The resulting oil is chromatographed on 130 g. of silica gel and upon elution with a 1 to 1 by volume mixture of hexane and benzene and drying to constant weight, there is obtained (−)-1'-hydroxy-3-[hexyl (2)]-6,6,9-trimethyl-6a,10a-trans-6a, 7, 10, 10a-tetrahydrodibenzo (b,d)-pyran. After distillation under high vacuum the product has an $R_F$ value (silica gel chromatogram in chloroform) of 0.58 and a boiling point of 190°C./0.001 mmHg.

Example 2

A mixture of 2.16 g. (9.15mMol) of 2-(3,5-dihydroxyphenyl)-3-methyl octane, 1.4g. (9.2 mMol) of +-trans-p-menthadien-(2,8)-ol-(1) and 175 mg. (0.92 mMol) of p-toluene sulphonic acid monohydrate in 60 ml. of benzene is heated under reflux for 2 ¼ hours. The resulting solution is cooled with an ice-water bath and dissolved in diethyl ether. The ether solution is immediately shaken once with a dilute sodium hydrogen carbonate solution and once with a sodium chloride solution. The solution is then dried over sodium sulphate and after evaporation of the ether there remains 3.4 g. of a light yellow oil. The resulting yellow oil is chromatographed on 70 g. of silica gel and upon elution with 1 to 1 by volume mixture of hexane and benzene and drying to constant weight, (−)-1-hydroxy-3-[3-methyloctyl(2)]-6,6,9-trimethyl-6a,10a-trans-6a,7,10,-10a-tetrahydrodibenzo(b,d)-pyran is produced. Upon distillation under high vacuum, this product has an $R_F$ value (silica gel chromatogram in chloroform) of 0.55 and a boiling point of 190°C./0.001 mmHg.

Example 3

A 2.84 g. (20 mMol) of orcinol-monohydrate is mixed with 3.05 g. (20 mMol) of +-trans-p-menthadien-(2,8)-ol-(1) in 50 ml. of benzene and 0.39 g. (2 mMol) of p-toluene sulphonic acid monohydrate. This mixture is 7,10,10 at reflux for 2 hours. The resulting reaction solution is added to 50 ml. of diethyl ether and extracted once with a dilute sodium bicarbonate solution. The ether phase is dried over sodium sulphate to evaporate the ether. There results 5.6 g. of a yellow oil which is chromatographed with 180 g. of silica gel and eluted with benzene. The eluted solution is distilled at high vacuum yeilding 2350 mg. of (−)-1-hydroxy-3,6,6,9-tetramethyl-6a, 10a-trans-6a,a-tetrahydrodibenzo(b,d)-pyran. This compound has an $R_F$ value of 0.48 and a boiling point of 130°–140°C./0.001 mmHg.

Example 4

A mixture of 2.2 g. of (20 mMol) of crystalline resorcinol, 3.05 g. (20 mMol) (+)-trans-p-methadien-(2,8)-ol-(1) and 0.4 g. (2 mMol) of p-toluene sulphonic acid monohydrate in 50 ml. of benzene is heated under reflux for 2 hours. The resulting solution is dissolved in 50 ml. of diethyl ether. The ether is extracted once with dilute sodium bicarbonate solution. The ether phase is dried and evaporated. 5.1 g. of a yellow oil is obtained. This oil is chromatographed on 250 g. of silica gel and eluded with benzene. After distilling off the benzene under high vacuum, there is otained 778 mg. of (−)1-hydroxy-6,6,9-trimethyl-6a, 10a-trans-6a, 7, 10, 10a-tetrahydrodibenzo(b,d)-pyran. This compound has an $R_F$ value (silica gel thin layer chromatogram in chloroform) of 0.35 and a boiling point of 155°C./0.001 mmHg.

Example 5

A mixture of 2.6 g. (13.4 mMol) of 2-(3,5-dihydroxyphenyl) hexane, 2.05 g. (13.4mMol) of (+)-trans-p-menthadien-(2,8)-ol-(1) and 260 mg. (1.35 mMol) of p-toluenesulphonic acid monohydrate in 60 ml. of benzene is boiled under reflux for 2 ½ hours. The resulting orange solution is cooled in an ice-water bath and dissolved in diethyl ether. The ether solution is immediately shaken once with a dilute sodium hydrogen carbonate solution and once with a sodium choride solution. The now almost completely colorless solution is dried over sodium sulphate. After evaporation of the ether there remains 4.85 g. of a light yellow oil. The resulting oil is chromatographed on 130 g. of silica gel and upon elution with a 1 to 1 by volume mixture of hexane and benzene and drying to constant weight, there is obtained (−)-1hydroxy-3-[hexyl(2)]-6,6,9-trimethyl-6a,10a-trans-6a,7, 10,10a-tetrahydrodibenzo(b,d)-pyran. After distillation under high vacuum the product has an $R_F$ value (silica gel chromatogram in chloroform) of 0.58 and a boiling point of 190°C./0.001 mmHg.

Example 6

A mixture of 350 mg (1.68 mMol) of 2-methyl-2-(3,5-dihydroxyphenyl)-hexane, 260 mg of (+)-trans-p-menthadien-(2,8)-ol-(1) (1.70 mMol) and 40 mg (0.21 mMol) of p-toluene-sulfonic acid monohydrate in 20 ml of benzene is refluxed for 2 ¼ hours. The resulting solution is cooled in an ice-water bath and treated first with dilute aqueous hydrogen carbonate solution and then with diethyl ether. After separation of the organic phase the latter is treated with saturated aqueous sodium chloride solution. The straw colored ether solution thus obtained is dried over sodium sulfate. By evaporation of the ether a residue of 640 mg of a light yellow oil is obtained which is chromatographed on 20 g of silica gel. Upon elution with benzene 560 mg of (−)-1-hydroxy-3-[2-methylhexyl (2)]-6,6,9-trimethyl-6a,10a-trans-6a,7,10,10a tetrahydrodibenzo(b,d)-pyran are obtained. Distillation of this product under high vacuum yields 535 mg of the purified product boiling at 140° 0,001 mm Hg $[x]_D^{20}$-247°(0.2 in $CHCl_3$). The $R_F$-value is 0.59. The starting hexane compound can be obtained according to the procedure described by T. Petrzilka, W. Haefliger & C. Sikemeier in Helvetica Chimica Acta 52, 1102 (1969).

Example 7

A mixture of 2.6 g. (9.15 mMol) of 2-(3,5-dihydroxyphenyl)-3-methyl octaine, 1.4 g. (9.2 mMol) of (+)-trans-p-menthadien-(2,8 )-ol-(1) and 175 mg. (0.92 mMol) of p.toluene sulphonic acid monohydrate in 60 ml of benzene is heated under reflux for 2 ¼ hours. The resulting solution is cooled with an ice-water bath and dissolved in diethyl ether. The ether solution is immediately shaken once with a dilute sodium hydrogen carbonate solution and once with a sodium chloride solution. The solution is then dried over sodium sulphate andd after evaporation of the ether there remains 3.4 g. of a light yellow oil. The resulting yellow oil is chromatographed on 70 g. of silica gel and upon elution with 1 to 1 by volume mixture of hexane and benzene and drying to constant weight, (−)-1-hydroxy-3-[3-methyloctyl(2)]-6,6,9-trimethyl-6a,10a-trans-6a,7,10,10a-tetrahydrodibenzo (b,d)-pyran is produced. Upon distillation under high vacuum, this product has an $R_F$ value (silica gel chromatogram in chloroform) of 0.55 and a boiling point of 190°C./0.001 mmHg.

While the foregoing is an accurate and complete disclosure of the invention, it is not intended to limit its scope in any way as defined by the appended claims.

I claim:

1. The (−)-antipode of a dibenzopyran of the formula

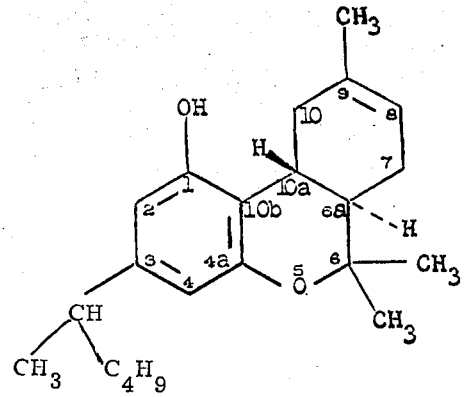

said dibenzopyran being is substantially pure form and being substantially free from its (+)-optical antipode.

2. The (—)-antipode of a dibenzopyran of the formula
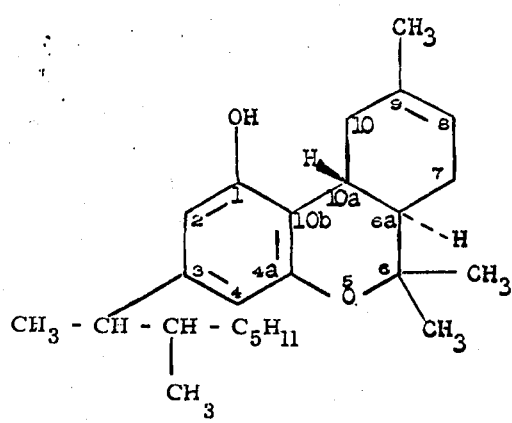
said dibenzopyran being in substantially pure form and being substantially free from its (+)-optical antipode.
3. The (—)-antipode of a dibenzopyran of the formula:
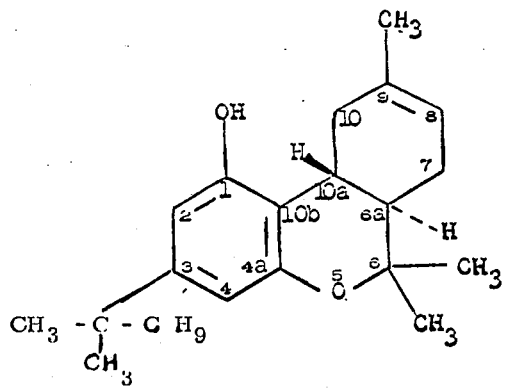
said dibenzopyran being in substantially pure form and being substantially free from its (+)-optical antipode.
* * * * *